US007679245B2

(12) United States Patent
Brackett et al.

(10) Patent No.: US 7,679,245 B2
(45) Date of Patent: Mar. 16, 2010

(54) REPULSIVE LIFT SYSTEMS, FLYWHEEL ENERGY STORAGE SYSTEMS UTILIZING SUCH SYSTEMS AND METHODS RELATED THERETO

(75) Inventors: Norman C. Brackett, North Reading, MA (US); Richard L. Hockney, Lynnfield, MA (US); Martin W. Frash, Newburyport, MA (US)

(73) Assignee: Beacon Power Corporation, Tyngsboro, MA (US)

( * ) Notice: Subject to any disclaimer, the term of this patent is extended or adjusted under 35 U.S.C. 154(b) by 0 days.

(21) Appl. No.: 10/244,493

(22) Filed: Sep. 16, 2002

(65) Prior Publication Data

US 2003/0052558 A1 Mar. 20, 2003

Related U.S. Application Data

(60) Provisional application No. 60/322,766, filed on Sep. 17, 2001.

(51) Int. Cl.
*H02K 7/09* (2006.01)
(52) U.S. Cl. .................................... 310/90.5
(58) Field of Classification Search ................ 310/90.5, 310/90
See application file for complete search history.

(56) References Cited

U.S. PATENT DOCUMENTS

| 2,244,197 | A | | 6/1941 | Hessler |
| 2,658,805 | A | | 11/1953 | Mendelsohn |
| 3,261,655 | A | | 7/1966 | Ncher et al. |
| 3,323,763 | A | * | 6/1967 | Butts .......................... 248/606 |
| 3,390,709 | A | | 7/1968 | Schmidt |
| 3,747,998 | A | * | 7/1973 | Klein et al. ................. 310/90.5 |
| 3,749,528 | A | | 7/1973 | Rousseau et al. |
| 3,761,148 | A | | 9/1973 | Grosbard ..................... 308/10 |

(Continued)

FOREIGN PATENT DOCUMENTS

DE 4200824 7/1993

(Continued)

OTHER PUBLICATIONS

U.S. Appl. No. 60/246,962, filed Nov. 8, 2000.*

(Continued)

*Primary Examiner*—Dang D Le
(74) *Attorney, Agent, or Firm*—David G. Conlin; Steven M. Jensen; Edwards Angell Palmer & Dodge LLP (57) ABSTRACT

Featured is a method for passively-repulsively lifting a rotor assembly (11) of a flywheel energy storage system (10), comprising the steps of mechanically coupling a first permanent magnet (204a) to the rotor assembly (11) and fixedly positioning a second permanent magnet (204b) proximal to the first permanent magnet (204a) so that a repulsive force is generated therebetween causing the first permanent magnet (204a) to move with respect to the second permanent magnet (204b), thereby causing the rotor assembly (11) to be lifted to an operating level. The method further includes applying a radial force sufficient in magnitude and direction to oppose a radial force being generated by the permanent magnet repulsive force. Also featured is a passive-repulsive rotor assembly lift system (100) for a flywheel energy storage system (10) and a flywheel energy storage system (10) including such a repulsive rotor lift system (100).

17 Claims, 4 Drawing Sheets

U.S. PATENT DOCUMENTS

| | | | |
|---|---|---|---|
| 3,771,909 A | 11/1973 | Rousseau et al. | |
| 3,780,937 A | 12/1973 | Tahara et al. | |
| 3,860,300 A | 1/1975 | Lyman | |
| 3,874,778 A * | 4/1975 | Kato et al. | 359/200 |
| 3,899,223 A | 8/1975 | Baermann | |
| 3,909,082 A | 9/1975 | Ishikawa et al. | |
| 3,955,858 A | 5/1976 | Poubeau | |
| 4,184,572 A | 1/1980 | Poubeau | |
| 4,193,646 A | 3/1980 | Rockl et al. | |
| 4,211,452 A | 7/1980 | Poubeau | |
| 4,223,240 A | 9/1980 | Theyse | 310/74 |
| 4,236,426 A * | 12/1980 | Meinke et al. | 74/574 |
| 4,263,819 A | 4/1981 | Poubeau | |
| 4,285,251 A | 8/1981 | Swartout | |
| 4,300,807 A | 11/1981 | Poubeau | |
| 4,324,440 A | 4/1982 | Steigenberger et al. | |
| 4,325,586 A | 4/1982 | Hubert et al. | |
| 4,329,000 A | 5/1982 | Keske | |
| 4,334,718 A * | 6/1982 | Hirt et al. | 310/90.5 |
| 4,353,602 A | 10/1982 | Habermann | |
| 4,379,598 A * | 4/1983 | Goldowsky | 310/90.5 |
| 4,444,444 A | 4/1984 | Benedetti et al. | |
| 4,511,190 A | 4/1985 | Caye et al. | |
| 4,517,505 A | 5/1985 | Cunningham | |
| 4,520,688 A | 6/1985 | Ban | |
| 4,563,046 A | 1/1986 | Shimamoto | |
| 4,566,740 A | 1/1986 | Beau et al. | |
| 4,601,591 A | 7/1986 | Wright | |
| 4,668,885 A | 5/1987 | Scheller | |
| 4,700,094 A | 10/1987 | Downer et al. | |
| 4,723,735 A | 2/1988 | Eisenhaure et al. | |
| 4,768,921 A | 9/1988 | Shinjiro et al. | |
| 4,785,212 A | 11/1988 | Downer et al. | |
| 4,860,611 A | 8/1989 | Flanagan et al. | |
| 4,900,962 A | 2/1990 | Hockney et al. | |
| 4,934,781 A * | 6/1990 | Kato et al. | 359/200 |
| 5,019,738 A * | 5/1991 | Weilbach et al. | 310/90.5 |
| 5,021,697 A * | 6/1991 | Kralick | 310/90.5 |
| 5,065,060 A | 11/1991 | Takahashi et al. | |
| 5,111,102 A | 5/1992 | Meeks | |
| 5,126,610 A | 6/1992 | Fremerey | |
| 5,212,419 A | 5/1993 | Fisher et al. | |
| 5,214,981 A | 6/1993 | Weinberger et al. | |
| 5,231,323 A | 7/1993 | New | |
| 5,295,744 A | 3/1994 | Petrzelka et al. | |
| 5,314,868 A | 5/1994 | Takahata et al. | |
| 5,315,197 A | 5/1994 | Meeks et al. | |
| 5,319,273 A | 6/1994 | Hockney et al. | |
| 5,346,362 A | 9/1994 | Bonner et al. | |
| 5,398,571 A | 3/1995 | Lewis | |
| 5,407,282 A * | 4/1995 | Bade et al. | 384/126 |
| 5,436,512 A | 7/1995 | Inam et al. | |
| 5,446,018 A | 8/1995 | Takahata et al. | |
| 5,495,221 A * | 2/1996 | Post | 335/299 |
| 5,514,924 A | 5/1996 | McMullen et al. | |
| 5,521,448 A * | 5/1996 | Tecza et al. | 310/90.5 |
| 5,548,170 A | 8/1996 | Shultz | |
| 5,553,834 A | 9/1996 | Je et al. | |
| 5,559,381 A | 9/1996 | Bosley et al. | |
| 5,614,777 A | 3/1997 | Bitterly et al. | |
| 5,625,240 A * | 4/1997 | Bernus | 310/90.5 |
| 5,628,232 A | 5/1997 | Bakholdin et al. | |
| 5,646,458 A | 7/1997 | Bowyer et al. | |
| 5,679,992 A * | 10/1997 | Miyamoto et al. | 310/90.5 |
| 5,682,071 A | 10/1997 | Buhler et al. | |
| 5,708,312 A | 1/1998 | Rosen et al. | |
| 5,747,907 A | 5/1998 | Miller | |
| 5,749,700 A * | 5/1998 | Henry et al. | 415/104 |
| 5,760,506 A * | 6/1998 | Ahlstrom et al. | 310/74 |
| 5,816,712 A | 10/1998 | Brown et al. | |
| 5,831,362 A | 11/1998 | Chu et al. | |
| 5,834,867 A * | 11/1998 | Kikuchi et al. | 310/51 |
| 5,838,082 A | 11/1998 | Ito et al. | |
| 5,847,480 A | 12/1998 | Post | 310/90.5 |
| 5,880,544 A | 3/1999 | Ikeda et al. | |
| 5,905,321 A | 5/1999 | Clifton et al. | |
| 5,920,138 A | 7/1999 | Clifton et al. | |
| 5,932,935 A | 8/1999 | Clifton et al. | |
| 5,942,825 A | 8/1999 | Lee | |
| 5,945,754 A | 8/1999 | Fulwood et al. | |
| 5,969,446 A | 10/1999 | Eisenhaure et al. | |
| 5,998,899 A | 12/1999 | Rosen et al. | |
| 6,019,319 A | 2/2000 | Falbel | |
| 6,029,538 A | 2/2000 | Little et al. | |
| 6,043,557 A | 3/2000 | Phelps, Jr. et al. | |
| 6,057,618 A * | 5/2000 | Brunken, Jr. | 310/90.5 |
| 6,150,742 A | 11/2000 | Horner et al. | |
| 6,160,331 A | 12/2000 | Morreale | |
| 6,172,435 B1 | 1/2001 | Tanaka | |
| 6,191,513 B1 | 2/2001 | Chen et al. | 310/90 |
| 6,191,515 B1 | 2/2001 | Post | |
| 6,194,801 B1 | 2/2001 | Goransson | |
| 6,220,009 B1 | 4/2001 | Coenen | |
| 6,224,533 B1 * | 5/2001 | Bengtsson et al. | 494/82 |
| 6,261,061 B1 | 7/2001 | Pfaffenberger | |
| 6,262,505 B1 | 7/2001 | Hockney et al. | 310/90.5 |
| 6,267,876 B1 | 7/2001 | Allaire et al. | |
| 6,388,347 B1 | 5/2002 | Blake et al. | |
| 6,420,810 B1 * | 7/2002 | Jeong | 310/90.5 |
| 6,424,067 B1 | 7/2002 | Samways | |
| 6,483,216 B2 | 11/2002 | Bouille et al. | |
| 6,536,953 B1 | 3/2003 | Cope et al. | |
| 6,617,733 B1 | 9/2003 | Yamauchi et al. | |
| 6,624,542 B1 | 9/2003 | Gabrys et al. | |
| 6,630,761 B1 * | 10/2003 | Gabrys | 310/90.5 |
| 6,695,656 B2 | 2/2004 | Fuse et al. | |
| 6,707,187 B1 * | 3/2004 | Gabrys | 310/74 |
| 6,710,489 B1 * | 3/2004 | Gabrys | 310/90.5 |
| 6,727,616 B1 * | 4/2004 | Gabrys et al. | 310/90.5 |
| 6,747,378 B2 | 6/2004 | Brackett | |
| 2002/0063368 A1 | 5/2002 | Kabir | |
| 2003/0099417 A1 | 5/2003 | Bauer et al. | |

FOREIGN PATENT DOCUMENTS

| | | |
|---|---|---|
| EP | 0955398 | 11/1999 |
| EP | 1 083 349 | 3/2001 |
| FR | 2565310 | 12/1985 |
| JP | 56-141442 | 11/1981 |
| JP | 58065321 | 4/1983 |
| JP | 8275444 | 10/1996 |
| JP | 93-08185 | 11/1997 |
| JP | 10-225017 | 8/1998 |
| JP | 2001-045704 | 2/2001 |
| WO | 97/48169 | 12/1997 |
| WO | 98/43341 | 10/1998 |
| WO | 99/40668 | 8/1999 |
| WO | WO-03/023249 | 3/2003 |
| WO | WO-03/023942 | 3/2003 |

OTHER PUBLICATIONS

J.J. Adamo & Associates, Inc. "Knitted Wire Mesh Gaskets And Seals", http://www.jjadamo.com/knittedwire.html. Dec. 1, 2007.

Zarzour, Mark et al. "Experimental Evaluation of a Metal Mesh Bearing Damper", ASME vol. 122, Apr. 2000. pp. 326-329.

U.S. Department of Commerce National Technical Information Service, "Investigation of Rotor Dynamic and High-Speed Bearing Technology For a 3KW Turboalternator. Part III. Ball Bearing Endurance Tests" Jan. 1976.

* cited by examiner

REPULSIVE LIFT SYSTEMS, FLYWHEEL ENERGY STORAGE SYSTEMS UTILIZING SUCH SYSTEMS AND METHODS RELATED THERETO

CROSS REFERENCE TO RELATED APPLICATIONS

This application claims the benefit of U.S. Provisional Application No. 60/322,766 filed Sep. 17, 2001.

FIELD OF INVENTION

The present invention relates to rotor lift systems for flywheel energy storage systems and, more particularly, to lift systems that passively and repulsively lift the rotor assembly of flywheel energy storage systems using permanent magnets in combination with a radial damping system, and to methods and flywheel energy storage systems using the lift systems.

BACKGROUND OF THE INVENTION

Conventional lift systems for the rotor assembly of flywheel energy storage systems (FESS) typically use the attractive force of permanent magnets in combination with an active control loop on an electromagnet to provide rotor assembly lifting force. Typically, permanent magnets are structured and arranged on the FESS so that attractive force between the permanent magnets lifts a portion, typically a substantial portion, of the weight of the rotor assembly. An electromagnet can provide the remainder of or, alternatively, all of, the force needed to completely lift the rotor assembly so that it can be rotated frictionlessly. Conventional lift systems also include bearings such as ball bearings to provide radial damping and limited axial stiffness.

The electromagnet and related control loop, however, are expensive and complex. The electromagnet also generates heat energy that is difficult to dissipate from the FESS because the electromagnets are contained within a housing under vacuum. In addition, the permanent magnets are generally located in regions of the FESS where the magnetic flux field can influence or affect the ball bearings, for example, due to magnetic flux leakage.

Thus, it would be desirable to provide new rotor assembly lift systems whereby the rotor assembly can be lifted without the use of an electromagnet and, further, to provide methods for passively-repulsively lifting the rotor. It would be particularly desirable to provide such systems and methods that would passively-repulsively lift a rotor assembly, for example, using permanent magnets that are structured and arranged so that the magnetic flux fields produced by each of the permanent magnets are of the same pole to produce a repulsive force between the permanent magnets. Moreover, it would be desirable to provide such systems and methods that include a mechanism for imposing a radial force of sufficient direction and magnitude to oppose the radial component of the repulsive force generated by the permanent magnets. It also would be particularly desirable to control the magnetic fluxes being generated by these permanent magnets in such a manner that they should not have an influence on ball bearings. Further, it would be desirable to provide rotor lift systems that would be less complex and less costly as compared to prior art lift systems, particularly those employing electromagnets and control loops.

SUMMARY OF THE INVENTION

The present invention features rotor assembly lift systems that passively-repulsively lift the rotor assembly of a flywheel energy storage system using permanent magnets. Also featured are systems utilizing such rotor assembly lift systems and methods for lifting rotor assemblies related to such devices and systems.

A first embodiment of the present invention provides a method for passively-repulsively lifting a rotor assembly, which method includes the steps of mechanically coupling a first permanent magnet to the rotor and, further, positioning a second permanent magnet proximal the first permanent magnet so that a repulsive force is generated therebetween. In this way the repulsive force being generated causes one of the first and second permanent magnets to move with respect to the other of the first and second permanent magnets, thereby lifting the rotor assembly. The method further includes applying a radial force sufficient in magnitude and direction to oppose the radial repulsive force developed between the first and second permanent magnets.

In a second embodiment, the present invention provides a passive-repulsive rotor assembly lift system that is particularly suited for use in a flywheel energy storage system (FESS). The rotor assembly lift system comprises a first permanent magnet mechanically coupled to the rotor assembly and a second permanent magnet mechanically coupled to a fixed, non-rotating structure of the FESS. The rotor assembly lift system is, further, structured and arranged so that same magnetic poles of the first and second permanent magnets oppose each other, so as to cause, thereby, the first permanent magnet, which is mechanically coupled to the rotor assembly, to move with respect to the second permanent magnet and thus lift the rotor assembly to an operational position. The rotor assembly lift system also includes a mechanism, e.g., a damping system, that can impose a counter radial force sufficient in magnitude and direction to oppose the radial repulsive force developed between the first and second permanent magnets.

In a third embodiment, the present invention provides a FESS using such a rotor assembly lift system. Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference characters denote corresponding parts throughout the several views and wherein.

DETAILED DESCRIPTION OF THE INVENTION INCLUDING THE PREFERRED EMBODIMENTS THEREOF

Figure 1:
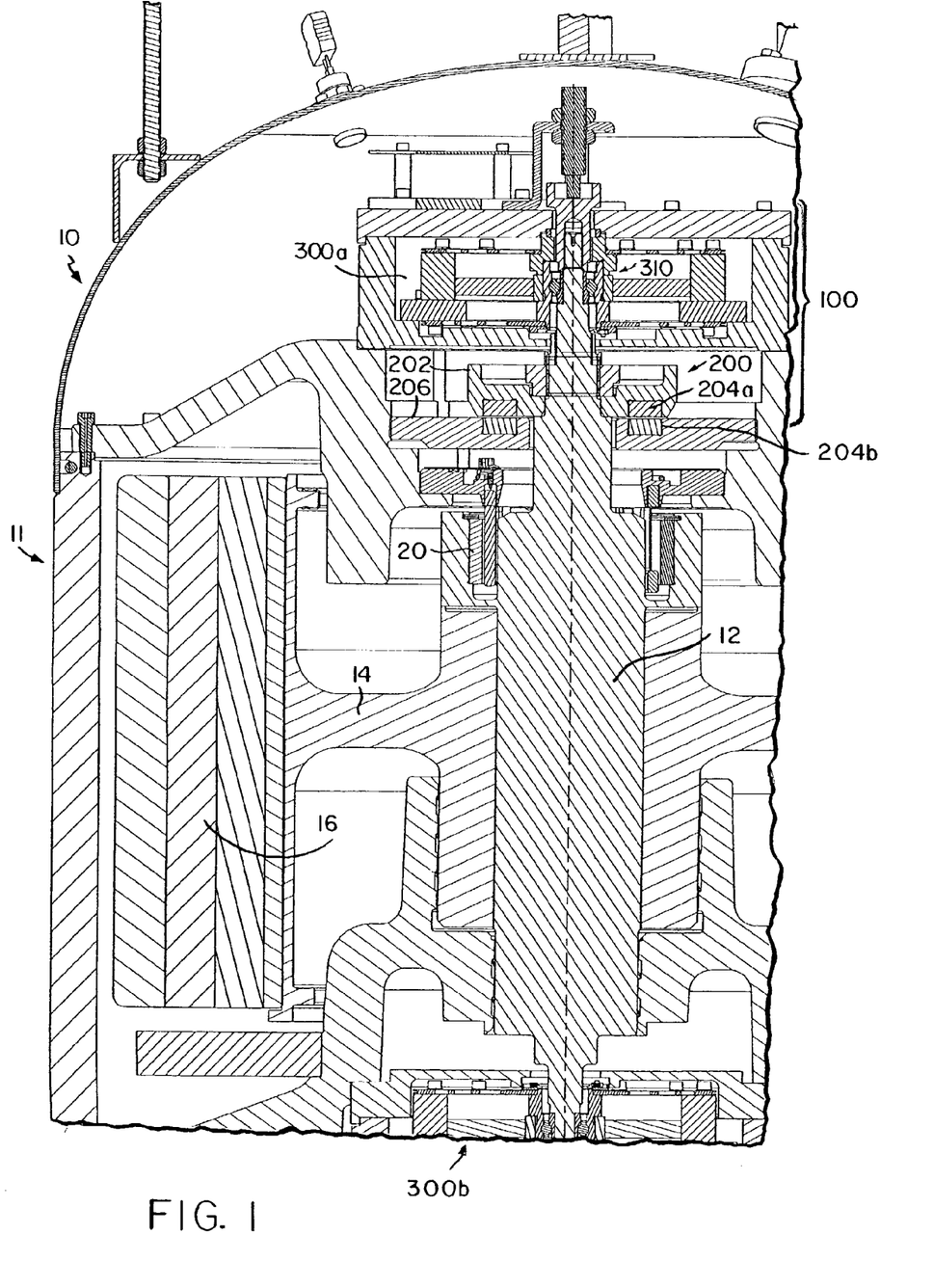
FIG. 1 is a partial cross-sectional elevation view of an illustrative embodiment of a flywheel energy storage system including a passive-repulsive lift system according to the present invention.

Referring now to the various figures of the drawings wherein like reference characters refer to like parts, there is shown in FIG. 1 a cross-sectional view of portions of an illustrative embodiment of a flywheel energy storage system (FESS) 10 in accordance with the present invention. The FESS 10 includes a rotor assembly 11, comprising a shaft 12, a hub 14, and a rotor 16, and a motor 20 that drives the shaft 12 so that the rotor 16 rotates at a desired rotational speed. FESSs and these elements are well known to the art and will not be described further herein.

The FESS 10, further, includes an upper bearing damping system 300a and a lower bearing damping system 300b, e.g., for damping vibrations produced by the bearings or bearing assembly 310 and removing heat from the upper and lower bearings or bearing assemblies 310 of the FESS 10, respectively. FIG. 4 provides an illustrative embodiment of a bearing damping system 300 using an elastomeric damper 320, which is further shown illustratively in FIG. 3. Reference, however, is made to U.S. Ser. No. 09/952,231 (entitled "FLEXIBLE BEARING DAMPING SYSTEM, ENERGY STORAGE SYSTEM USING SUCH A SYSTEM, AND A METHOD RELATED THERETO"), the teachings of which are incorporated herein by reference, for further details of the herein illustrative embodiment of both the elastomeric damper 320 and the bearing damping system 300.

Referring to FIG. 4, a conventional bearings or bearing assembly 310 will now be described. It should be noted at the outset that the embodiment depicted in FIG. 4 is illustrative for the purpose of describing the invention only and is not to be taken or construed as being limited thereto. Typically, bearings or bearing assemblies 310 include an inner race 311, an outer race 312, and roiling elements 313 that are disposed therebetween. Preferably, in this application, the inner race 311 of the bearings or bearing assembly 310 is in tight interference fit with the rotary shaft 12. As a result, the rotor 16 and the inner race 311 of the bearings or bearing assembly 310 can rotate virtually as a single unit. As the shaft 12 and inner race 311 rotate, rolling elements, e.g., ball bearings, 313 travel along the outer face of the inner race 311 as it rotates with the rotor 16. As the ball bearings 313 travel along the outer face of the inner race 311, the ball bearings 313 simultaneously travel along the inner face of the outer race 312, which is fixed and does not rotate. Preferably, the bearings or bearing assembly 310 is/are structured and arranged such that it can be securely and removably attached to a lower bearing cap 342. The lower bearing cap 342 facilitates adapting commercially available, off-the-shelf bearings and/or bearing assemblies 310 to the particular use described herein.

In a separate embodiment (shown in FIG. 4), the bearings or bearing assembly 310 is/are structured and arranged such that it is securely and removably confined between an upper bearing cap 347 and a lower bearing cap 342. The upper and lower bearing caps 347 and 342, similarly, facilitate adapting commercially-available, off-the-shelf bearing assemblies 310 to the particular use described herein.

The bearings or bearing assembly 310 generate(s) vibrations that can adversely affect the performance of the rotor assembly 11 and the FESS 10. As a result, it is important to dampen the vibrations as much as possible.

Figure 3:
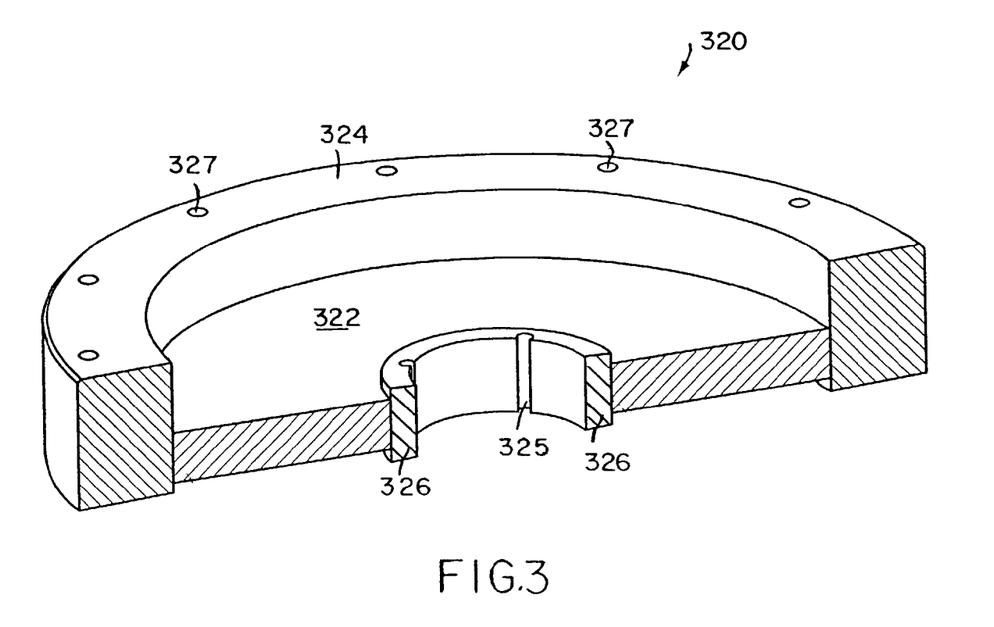
FIG. 3 is an isometric cross-sectional view of an illustrative embodiment of an elastomeric damper for use in conjunction with a damping mechanism in accordance with the present invention.
Figure 4:
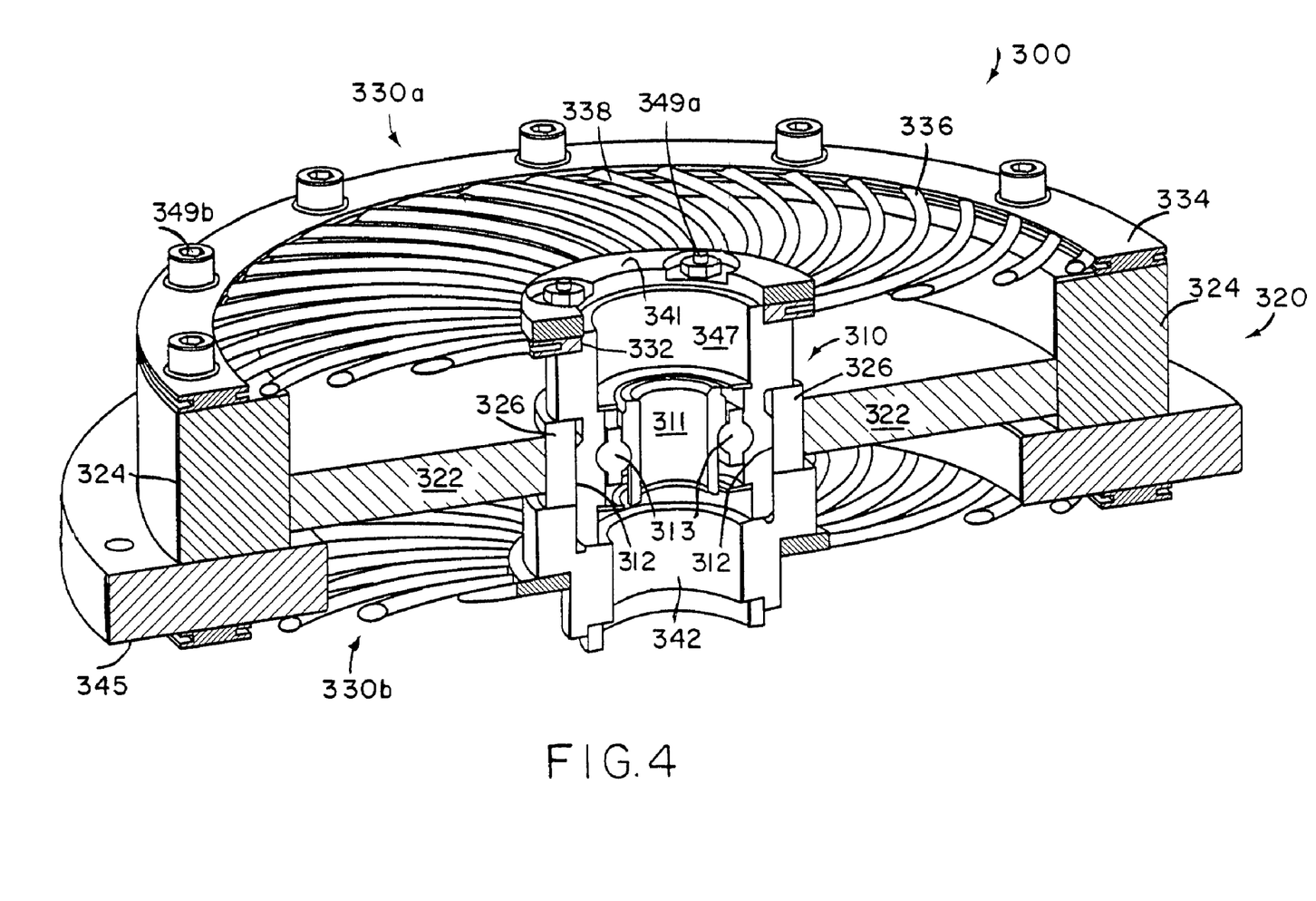
FIG. 4 is an isometric cross-sectional view of an illustrative embodiment of a damping mechanism in accordance with the present invention.

Referring to FIG. 3, the embodied flexible bearing damper 320 includes a core element 322 that is fixedly secured or tightly confined between a circumferential outer mounting ring 324 and a circumferential inner support ring 326. In a particular embodiment, the core element 322 is a metal mesh-type and/or fabricated from elastomers, e.g., silicon rubber, and the like, by at least one of molding, extruding, and the like. Also, the inner support ring 326 and outer mounting ring 324 are fabricated, e.g., cast, machined from bar stock, molded, and the like out of a good conducting material, e.g., aluminum, metals, alloys, carbon, including carbon fiber and carbon-carbon composites, and the like.

The inner support ring 326 is configured and arranged so that it produces a tight interference fit with the bearings or bearing assembly 310, and, more particularly, so that its inner periphery produces a tight interference fit with the outer race 312 of the bearings or bearing assembly 310. Likewise, the outer mounting ring 324 is configured and arranged to satisfy weight, balance, and spatial requirements.

In an exemplary embodiment, the inner support ring 326 includes a plurality of slots 325, which are configured and arranged to accept a similar plurality of inner securing bolts 349a. Likewise, the outer mounting ring 324 includes a plurality of holes 327 to accept a similar plurality of outer securing bolts 349b.

The bearings or bearing assembly 310 also generate(s) heat primarily from the movement of the rolling elements 313. Such heat must be transferred or conducted away from the bearings and/or bearing assemblies 310 to a remote heat sink to extend the operation life of the bearings or bearing assembly. According to the present invention, heat is transferred away from the bearings or bearing assembly 310 using one or more heat-transferring devices 330a and 330b.

One aspect of a heat-transferring device 330 will now be described. Reference, however, is made to U.S. Ser. No. 09/924,153 (entitled "DEVICE FOR COOLING A BEARING, FLYWHEEEL ENERGY STORAGE SYSTEM USING SUCH A BEARING COOLING DEVICE AND METHODS RELATED THERETO"), the teachings of which are incorporated herein by reference, for further details regarding the heat-transferring device 330. Referring again to FIG. 4, there is shown an illustrative embodiment of a pair of heat-transferring devices 330a and 330b combined within the embodied system 300. It should be noted at the outset that the embodiment depicted in FIG. 4 is illustrative for the purpose of describing the invention only and is not to be taken or construed as being limited thereto.

In broadest terms, the upper and lower heat-transferring devices 330a and 330b comprise flexible, thermally conductive members 338 having a first end and a second end. The first end of each flexible, thermally conductive member 338 is thermally coupled to the bearings or bearing assembly 310 and the second end is thermally coupled to a remote heat sink (not shown). Accordingly, at least some of the heat energy being generated by the bearings or bearing assembly 310 can be thermally communicated directly or indirectly to the remote heat sink.

Preferably, the heat-transferring devices 330a and 330b include first and second members 332 and 334 and a plurality of flexible members 336 therebetween, all of which are fabricated of a thermally conductive material. Preferably, the heat-transferring devices 330a and 330b are structured and arranged to provide a desired axial, transverse, and radial stiffness. The first thermally conductive member 332 is thermally connected or coupled and securely and removably attached to the bearings or bearing assembly 310, e.g., using a first connecting member 341. Alternatively, the first connecting member 341 is structured and arranged instead to be in direct communication with an upper bearing cap 347 and/or a lower bearing cap 342 as shown in FIG. 4.

The second thermally conductive member 334 of the illustrative heat-transferring device 330 is thermally connected or coupled directly or indirectly to a remote heat sink, e.g., to the outer mounting ring 324 of the bearing damper 320, to a mounting plate 345, and the like. As provided in the description above, the heat sink is remote from the locus of the bearings or bearing assembly 310 to be cooled.

A plurality of flexible thermally conductive members 336 is thermally connected or coupled to the first and second thermally conductive members 332 and 334 such that at least some of the heat energy being generated by the bearings or bearing assembly 310 is thermally communicated directly or indirectly to the remote heat sink sequentially by way of the first thermally conductive member 332, the plurality of flexible thermally conductive members 336, and the second thermally conductive member 334. Further, the plurality of flexible thermally conductive members 336 of the heat transferring device 330 is structured and arranged to enable at least one of relative axial or radial motion, preferably both axial and radial motion, between the first and second thermally conductive members 332 and 334. More particularly, the plurality of flexible thermally conductive members 336 is structured and arranged so that the heat-transferring device 330 provides minimal radial stiffness to the bearings or bearing assembly 310.

Referring again to FIG. 2, preferably, the FESS 10 of the present invention includes a passive-repulsive lift system 100 that includes a permanent magnet lift subassembly 200 and a mechanism for providing a radial stiffness sufficient in magnitude and direction to counteract the radial forces generated by the repulsive forces of the permanent magnets 204a and 204b of the permanent magnet lift subassembly 200. In a preferred embodiment, the mechanism for providing a radial stiffness is the upper bearing damping system 300a that was described in detail above.

Figure 2:
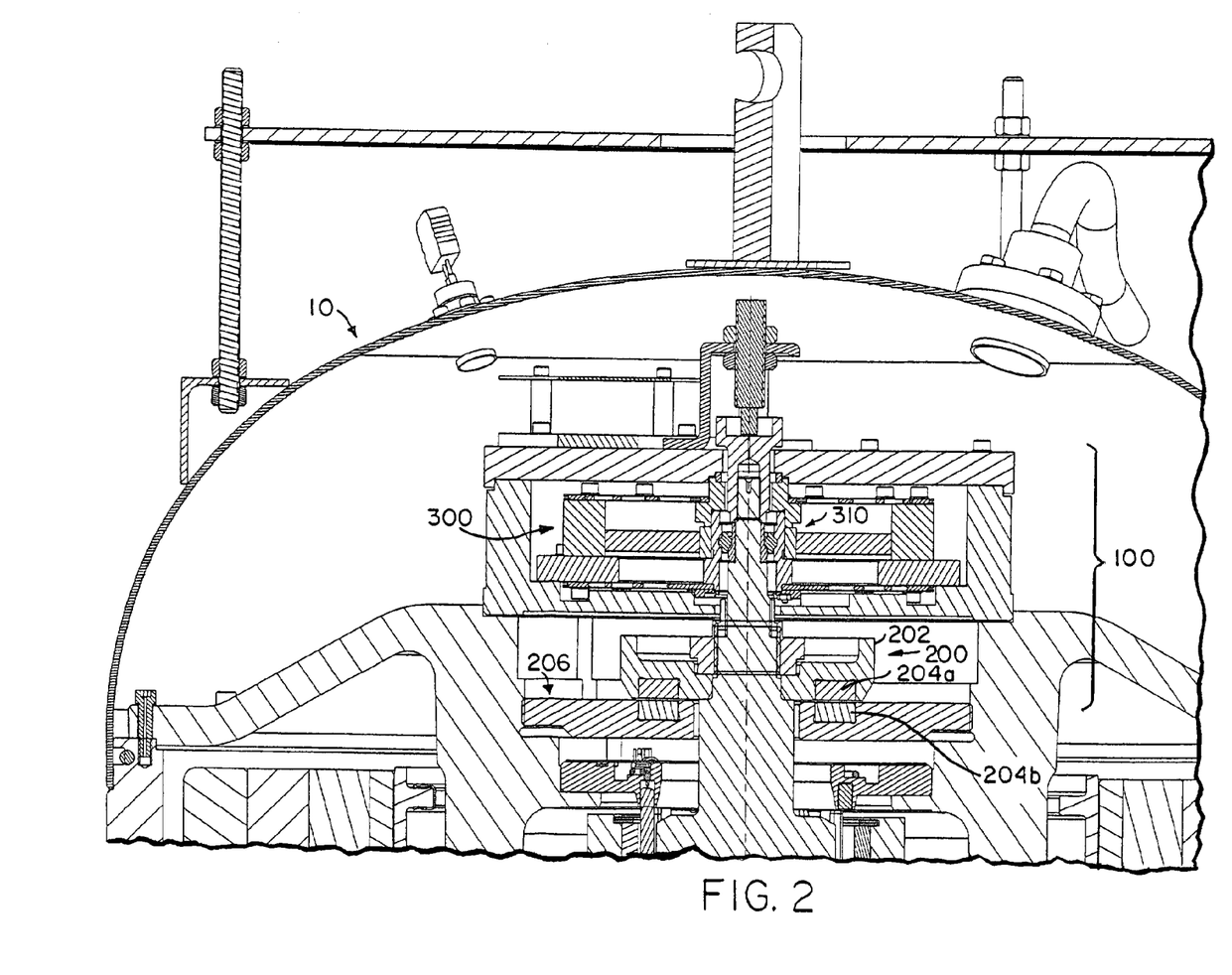
FIG. 2 is a partial cross-sectional elevation view of an illustrative embodiment a passive-repulsive lift system according to the present invention.

Preferably, the permanent magnetic lift subassembly 200 comprises a plurality of permanent magnets 204a and 204b, a rotor mounting cup 202, and a stator mounting cup 206. More preferably, the permanent magnetic lift subassembly 200 includes a first permanent magnet 204a that is structured and arranged in the rotor mounting cup 202 and a second permanent magnet 204b that is structured and arranged in the stator mounting cup 206.

The permanent magnets 204a and 204b that are secured in each of the mounting cups 202 and 206 can be one of an annular ring or annular ring segments that essentially form an annular ring when disposed in either of the mounting cups 202 and 206. Annular ring permanent magnets 204a and 204b can be secured to the mounting cups 202 and 206 adhesively, e.g., epoxy, or by tight interference fit. Segmented annular ring permanent magnets 204a and 204b can be adhesively secured to the mounting cups 202 and 206, e.g., using an epoxy.

The permanent magnets 204a and 204b are generally sized and configured so that the magnets 204a and 204b, when disposed in their respective mounting cups 202 and 206, have same magnetic poles opposite one another so that the magnets 204a and 204b repel one another. Moreover, the magnetic flux fields of the permanent magnets 204a and 204b have sufficient strength, i.e., axial force, to lift the rotor assembly 11 and to maintain the rotor assembly 11 in a lifted, or operational, state during normal operation of the FESS 10. Preferably, the permanent magnets 204a and 204b are rare-earth-type permanent magnets. More preferably, in a particular embodiment, the permanent magnets are Neodymium-Boron-Iron (NdBFe) magnets.

Each of the mounting cups 202 and 206 is structured and arranged so as to retain the permanent magnet annular ring or the permanent magnet annular ring segments securely therein. Preferably, that the permanent magnets 204a and 204b are capable of withstanding the operational loads for which the magnets 204a and 204b are designed with a factor of safety. For example, the rotor mounting cup 202 can be structured and arranged so that the first permanent magnet annular ring or the first permanent magnet annular ring segments 204a is/are not damaged by the radial forces being developed as the motor 20 drives the shaft 12 at the desired rotational speed.

Preferably, each of the mounting cups 202 and 206 is made of magnetic material, such as magnetic steel, to align the flux lines of the permanent magnets 204a and 204b so that the flux lines are localized, for example, in the magnetic steel. In this way, the magnetic flux of the permanent magnets 204a and 204b is aligned or oriented such that the flux lines do not affect or impact the shaft 12 and/or the bearings or bearing assembly 310. Moreover, magnetic material, e.g., magnetic steel, amplifies the magnetic flux field of the magnets 204a and 204b, which increases the axial lifting force. Also suitable, albeit less preferred, as material for the manufacture of the mounting cups 202 and 206 is aluminum and non-magnetic steel, which allow the magnetic flux field of the magnets 204a and 204b to leak, i.e., to diminish, rather than to amplify.

Each of the first and second permanent magnets 204a and 204b provides a magnetic flux field, which, because they are from the same pole, cause the magnets 204a and 204b to repulse and, thus, move away from the one another. The second permanent magnet 204b is attached to the stator mounting cup 202, which is affixed to the structural support of FESS 10. This arrangement is more rigid than that of first permanent magnet 204a, which is attached to the rotor mounting cup 206. As a result, repulsive forces between the like poles of the magnetic flux field cause the rotor assembly 11 to move relative to the structural support of the FESS 10 to an operating level. For numerous reasons that are known to the art, e.g., magnitude of the magnetic fields, irregularity of the magnetic flux fields, and the like, the repulsion of the first permanent magnet 204a relative to the second permanent magnet 204b manifests as an axial force and a non-axial force, i.e., radial force. Gravity and the weight of the rotor assembly 11 substantially counteract to oppose the axial force; however, a mechanism is needed to counteract the radial force so that the permanent magnets 204a and 204b remain centered or substantially centered over each other and so that repulsion of the first permanent magnet 204a does not cause harmful movement of the rotor assembly 11.

In a preferred embodiment, the radial force provided by the repulsion of the two permanent magnets 204a and 204b can be counteracted using a damper or damping mechanism 300 that provides sufficient radial stiffness to ensure that the permanent magnets 204a and 204b remain centered or substantially centered over each other. Preferably, the damper or damping mechanism 300 will be sufficiently stiff to serve that purpose while at the same time not so stiff as to produce a rotor assembly 11 critical speed (critical frequency) that is at, near or below the design operating speed (design operating frequency) of the rotor assembly 11. More preferably, the damper or damping mechanism 300 can be used concurrently as a bearing damping system 300a.

FIG. 4 shows an embodiment of a damping mechanism 300 that is structured and arranged about the shaft 12 of the rotor assembly 11 to dampen vibrations, to remove heat from the bearings or bearing assemblies 310, and to provide sufficient radial stiffness to overcome, i.e., counteract, the radial forces being generated by the permanent magnets 204a and 204b. The damping mechanism 300 includes one or more flexible bearing dampers 320 in combination with one or more heat transferring devices 330a and 330b, all of which have been described above. In current design, the previously described damping mechanism 300 is suitable for a 2 kilowatt (kW) FESS. However, if additional radial stiffness is required, then either the flexible bearing dampers 320 or one or more heat-transferring devices 330a and 330b can be stiffened.

Indeed, radial stiffness of the heat-transferring devices 330a and 330b and/or the flexible bearing dampers 320 can be adjusted so that these elements, individually or in combination, can develop and provide the desired radial stiffness to dampen vibrations as well as the desired axial stiffness/damping for the permanent magnet alignment of the present invention. For example, the length of the individual flexible conductive members 336 can be shortened so as to increase radial stiffness.

Figure 5:
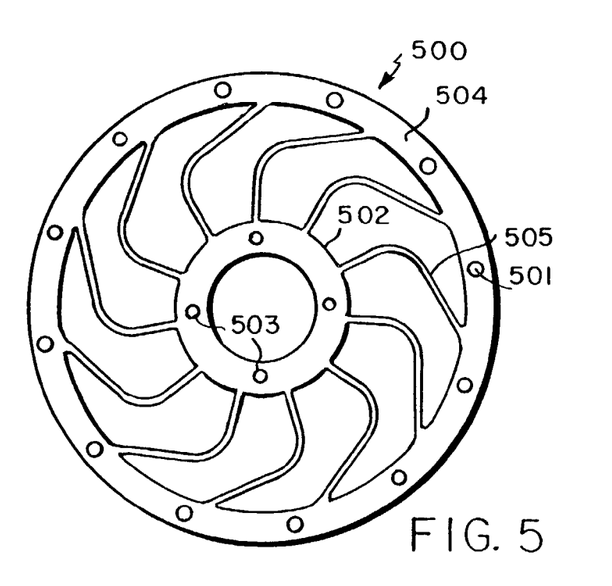
FIG. 5 is a plan view of an illustrative embodiment of metal spring in accordance with the present invention.

Alternatively, and more preferably, the damping mechanism 300 can include one or more metal springs 500. Indeed, in current design, a 6 kW requires one or more metal spring plates 500 to provide additional radial stiffness. For symmetrical purposes and to prevent turning or torsion, such spring plates 500 should be used in pairs.

Referring to FIG. 5, an illustrative example of a spring plate 500 will now be described. Preferably, spring plates 500 are made of metal, e.g., aluminum, copper, steel, and the like. More preferably, the metal spring plates 500 are fashioned from steel plating, e.g., by stamping the spring plates 500 with a tool die.

In a preferred embodiment, the spring plate 500 is substantially circular in shape with the same or substantially the same diameter as the heat-transferring devices 330. The spring plate 500 comprises an inner ring 502, an outer ring 504, and a plurality of flexible members 505. The inner ring 502 includes a plurality of holes 503 for securely and removably attaching the inner ring 502 of the spring plate 500 to at least one of the inner support ring 326 of the bearing damper 320, an upper and/or lower bearing cap 347 and 342, and the first thermally conductive member 332 of the heat-transferring device 330. The plurality of holes 503 are alignable with some or all of the aforementioned plurality of holes 325 in the inner support ring 326 of the bearing damper 320 as well as with some or all of the holes of the first thermally conductive member 332 of the heat-transferring device 330. The outer ring 504 includes a plurality of holes 501 for securely and removably attaching the outer ring 504 of the spring plate 500 to at least one of the outer mounting ring 324 of the bearing damper 320 and the second thermally conductive member 334 of the heat-transferring device 330. The plurality of holes are alignable with some or all of the aforementioned plurality of holes 327 in the outer mounting ring 324 of the bearing damper 320 and with some or all of the holes of the second thermally conductive member 334 of the heat-transferring device 330.

A plurality of spring legs 505 are disposed between the inner ring 502 and the outer ring 504 to provide additional radial stiffness if needed. Preferably, the plurality of spring legs 505 are structured and arranged radially about the spring plate 500. More preferably, the plurality of spring legs 505 is dog-legged to provide radial resistance only when needed.

Although a particular embodiment of a spring plate 500 has been described, the invention is not to be construed or limited thereto.

Although a preferred embodiment of the invention has been described using specific terms, such description is for illustrative purposes only, and it is to be understood that changes and variations may be made without departing from the spirit or scope of the following claims.

What is claimed is:

1. A method for passively-repulsively lifting a rotor assembly, comprising the steps of:
   mechanically coupling a first permanent magnet to the rotor assembly;
   fixedly positioning a second permanent magnet proximal the first permanent magnet so that a repulsive force is generated therebetween causing the first permanent magnet to move with respect to the second permanent magnet, thereby lifting the rotor assembly; and
   applying a radial force sufficient in magnitude and direction to oppose a radial force being generated by said repulsive force,
   wherein the step of applying a radial force is accomplished using a damping mechanism, and the damping mechanism also is a bearing damper system for the rotor assembly, the bearing damper system being in contact with a rolling element bearing assembly, wherein the rolling element bearing assembly maintains direct contact with the rotor assembly.

2. The method for passively-repulsively lifting a rotor assembly as recited in claim 1, wherein the step of applying a radial force is accomplished using the bearing damper system in combination with one or more spring plates to provide additional stiffness.

3. The method for passively-repulsively lifting a rotor assembly as recited in claim 1, wherein the mechanical coupling of the first permanent magnet and the fixedly positioning of a second permanent magnet does not affect the functioning of at least one of one or more ball bearings and one or more ball bearing assemblies.

4. A passive-repulsive rotor assembly lift system for a flywheel energy storage system, the lift system comprising:
   a first permanent magnet being mechanically coupled to the rotor assembly;
   a second permanent magnet mechanically coupled to a fixed member of the flywheel energy storage system;
   wherein the first permanent magnet produces a first magnetic flux field having a first magnetic pole and the second permanent magnet produces a second magnetic flux field having a second magnetic pole and said first and said second permanent magnets are structured and arranged so that the first and second magnetic poles are of the same pole and said first and said second permanent magnets oppose each other, thereby creating a repulsive force that causes the first permanent magnet to move with respect to the second permanent magnet and thus lift the rotor assembly to an operational position; and
   a damping mechanism for imposing a radial force sufficient in magnitude and direction to oppose a radial component of the repulsive force developed between said first and second permanent magnets, and the damping mechanism also is a bearing damper system for the rotor assembly, the bearing damper system being in contact with a rolling element bearing assembly, wherein the rolling element bearing assembly maintains direct contact with the rotor assembly.

5. The system as recited in claim 4, wherein the damping mechanism for imposing a radial force is the bearing damper system in combination with one or more spring plates.

6. The system as recited in claim 4, wherein the first permanent magnet is coupled to the rotor and the second permanent magnet is fixedly positioned to the fixed structure of the flywheel energy storage system so as not to affect the functioning of at least one of one or more ball bearings and one or more ball bearing assemblies.

7. The system as recited in claim 4, wherein said first permanent magnet comprises a permanent magnet annular ring.

8. The system as recited in claim 4, wherein said second permanent magnet comprises a permanent magnet annular ring.

9. The system as recited in claim 4, wherein said first permanent magnet is structured and arranged in a rotor mounting cap.

10. The system as recited in claim 4, wherein said second permanent magnet is structured and arranged in a stator mounting cap.

11. A flywheel energy storage system, comprising:
a rotor assembly;
a support structure;
a first permanent magnet, having a first magnetic pole, being mechanically coupled to the rotor assembly such that in operation the first permanent magnet moves axially, causing the rotor assembly to move in a predetermined, axial direction;
a second permanent magnet, having a second magnetic pole, mechanically coupled to the support structure, wherein the second permanent magnet is positioned with respect to the first permanent magnet so that the first magnetic pole is the same as the second magnetic pole so as to oppose each other, thereby causing the first permanent magnet to move axially with respect to the second permanent magnet; and
a damping mechanism for imposing a radial force sufficient in magnitude and direction to oppose a radial repulsive force developed between the first and second permanent magnets, and the damping mechanism also is a bearing damper system for the rotor assembly, the bearing damper system being in contact with a rolling element bearing assembly, wherein the rolling element bearing assembly maintains direct contact with the rotor assembly.

12. The system as recited in claim 11, wherein the damping mechanism for imposing a radial force is the bearing damper system in combination with one or more spring plates.

13. The system as recited in claim 11, wherein the first permanent magnet is coupled to the rotor assembly and the second permanent magnet is fixedly positioned to the fixed structure of the flywheel energy storage system so as not to affect the functioning of at least one of one or more ball bearings and one or more ball bearing assemblies.

14. The system as recited in claim 11, wherein said first permanent magnet comprises a permanent magnet annular ring.

15. The system as recited in claim 11, wherein said second permanent magnet comprises a permanent magnet annular ring.

16. The system as recited in claim 11, wherein said first permanent magnet is mechanically coupled to the rotor assembly in a rotor mounting cap.

17. The system as recited in claim 11, wherein said second permanent magnet is mechanically coupled to the support structure in a stator mounting cap.

* * * * *